Feb. 25, 1941.   W. E. SHEELER   2,233,112
MEANS FOR AND METHOD OF CHANGING PLAIN KNIT LOOPS INTO OTHER LOOPS
Filed April 21, 1939   9 Sheets-Sheet 3
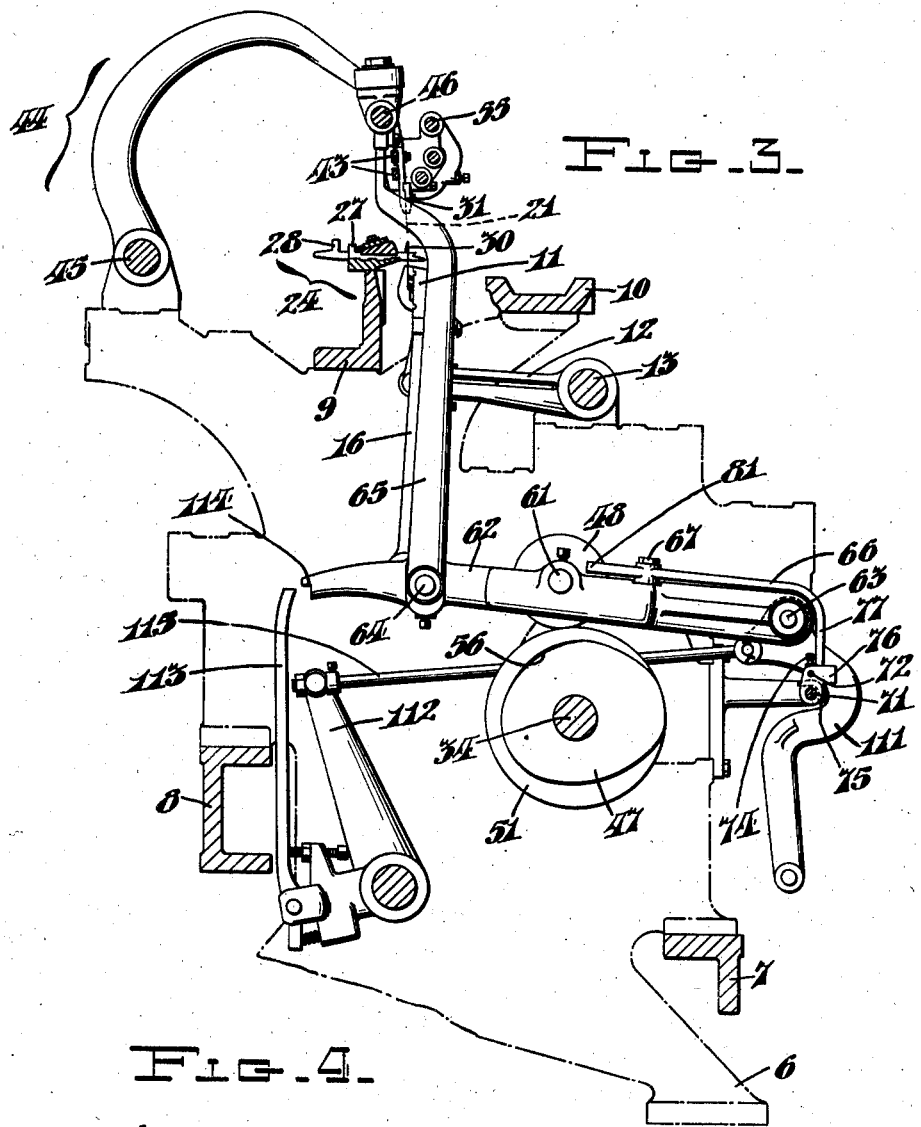
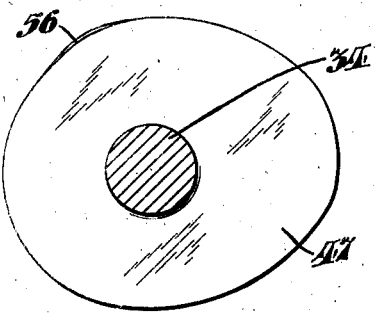
INVENTOR:
William E. Sheeler,
BY
ATTORNEY.

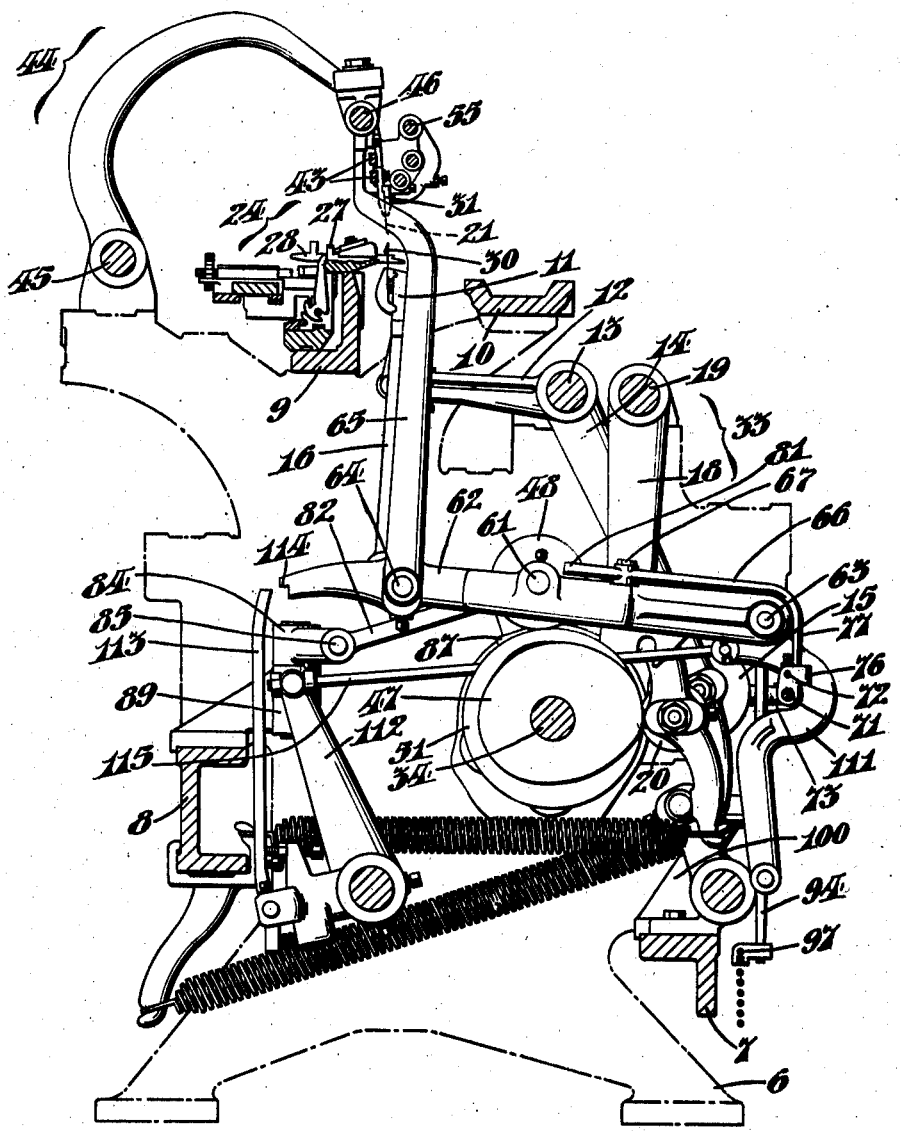

Feb. 25, 1941.  W. E. SHEELER  2,233,112
MEANS FOR AND METHOD OF CHANGING PLAIN KNIT LOOPS INTO OTHER LOOPS
Filed April 21, 1939  9 Sheets-Sheet 4
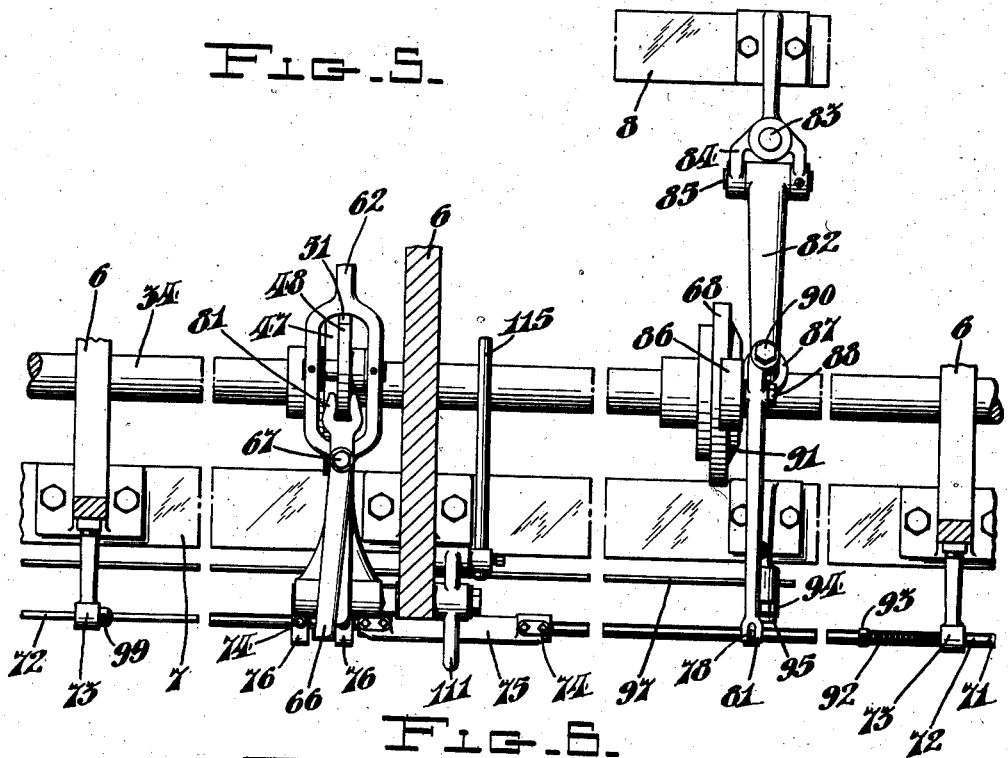
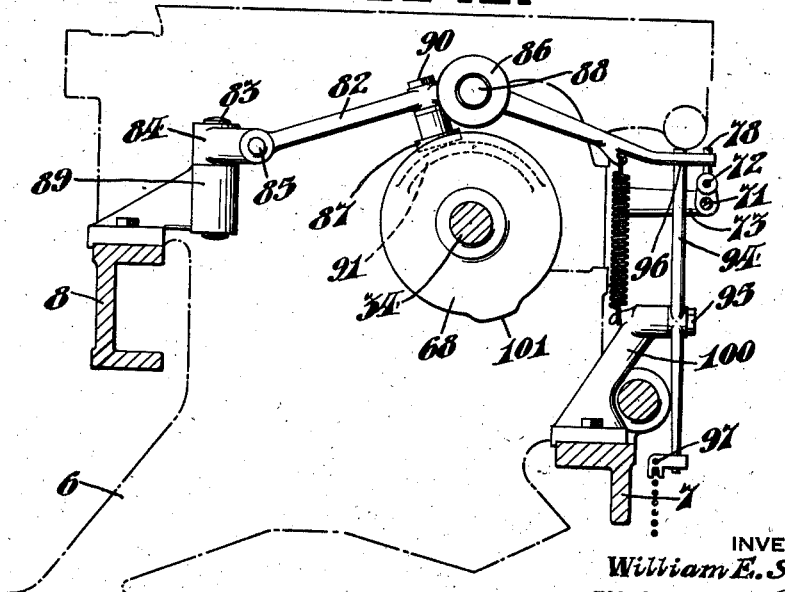
INVENTOR:
William E. Sheeler,
BY
ATTORNEY.

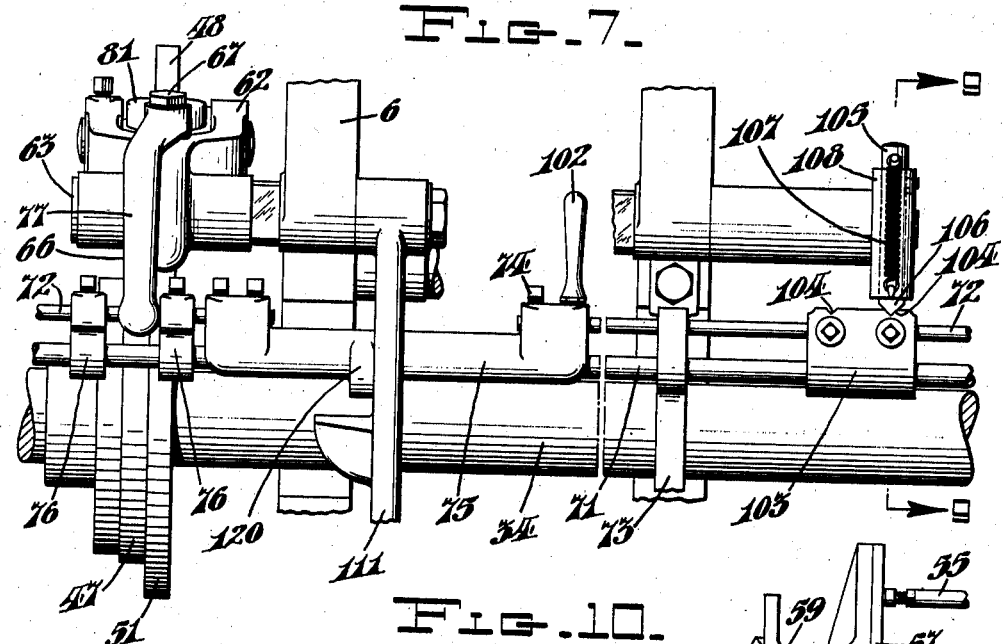
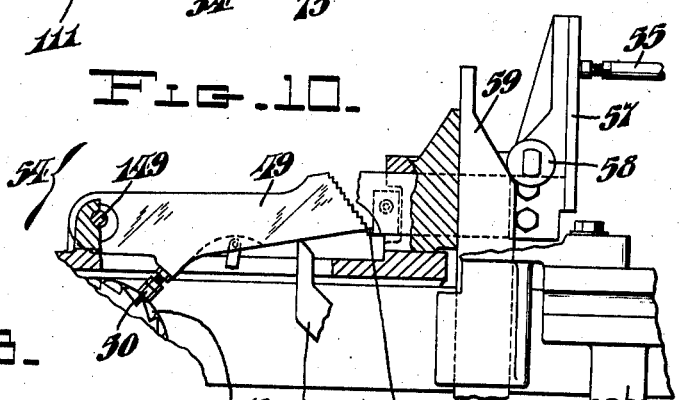
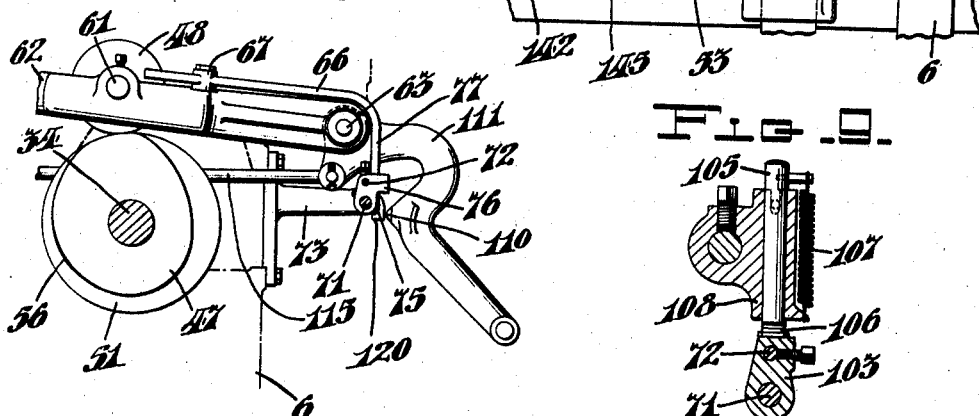
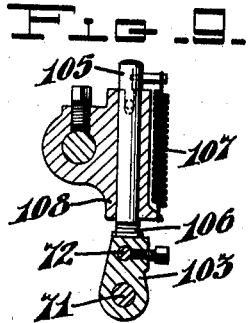

Feb. 25, 1941. W. E. SHEELER 2,233,112
MEANS FOR AND METHOD OF CHANGING PLAIN KNIT LOOPS INTO OTHER LOOPS
Filed April 21, 1939 9 Sheets-Sheet 6
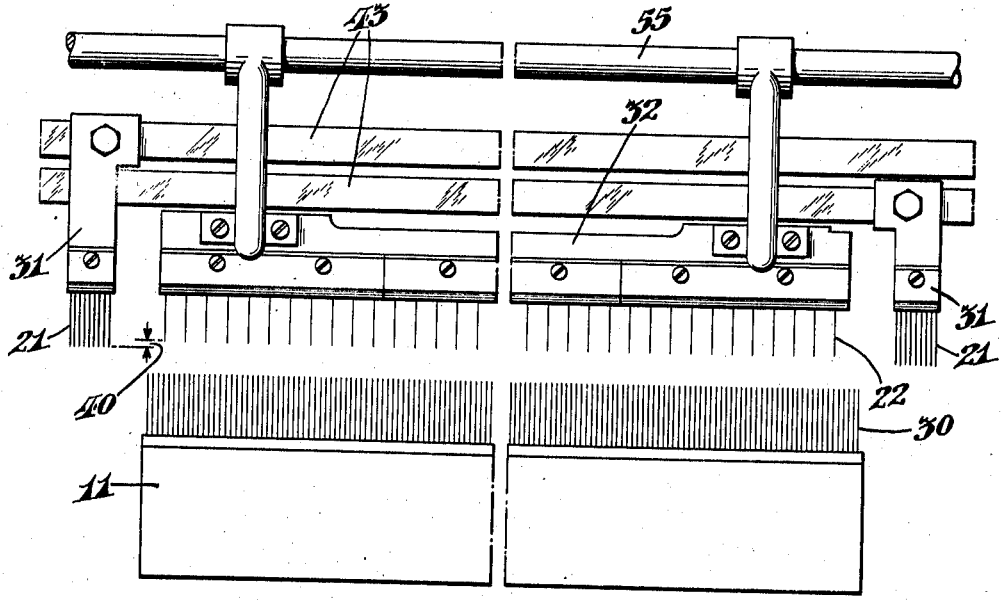
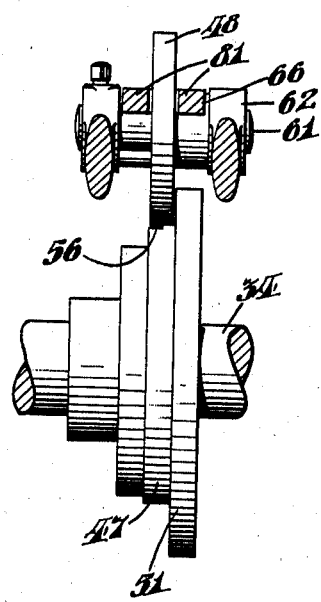
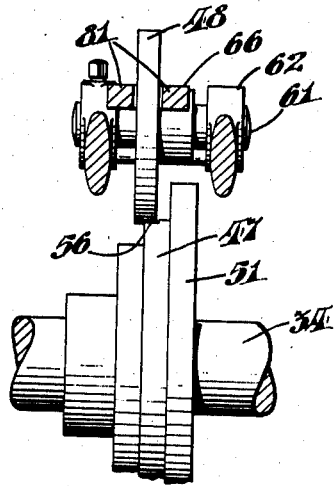
INVENTOR:
William E. Sheeler,
BY
ATTORNEY.

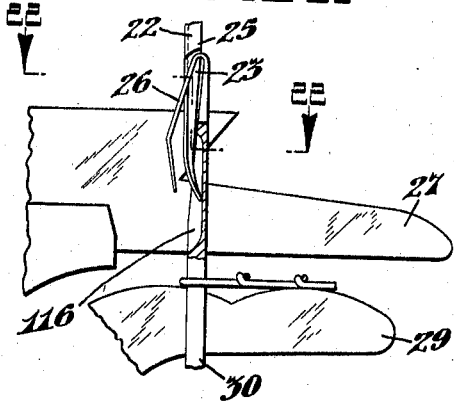
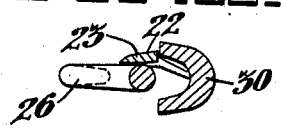
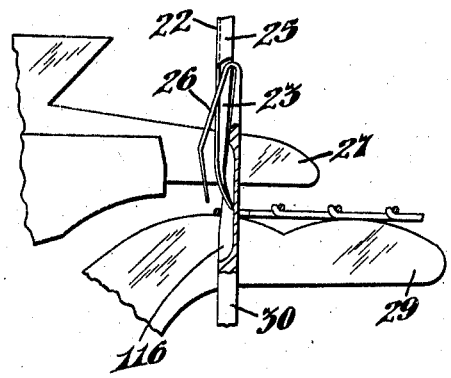
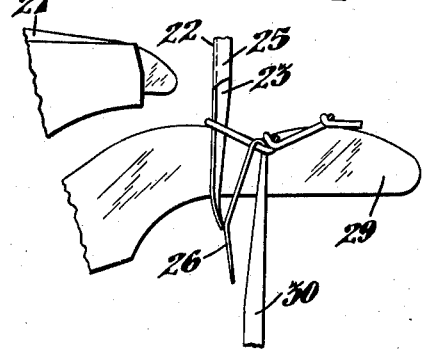
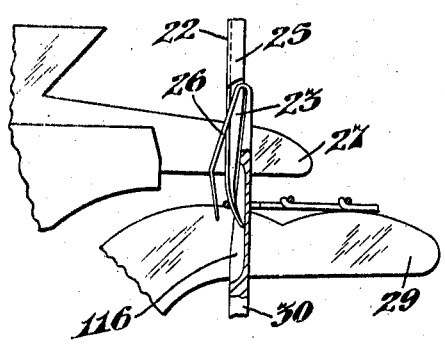
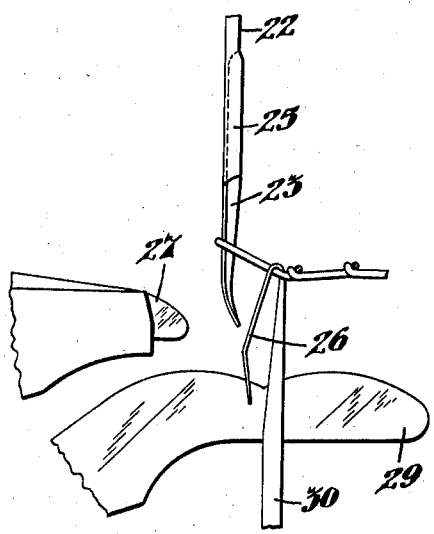

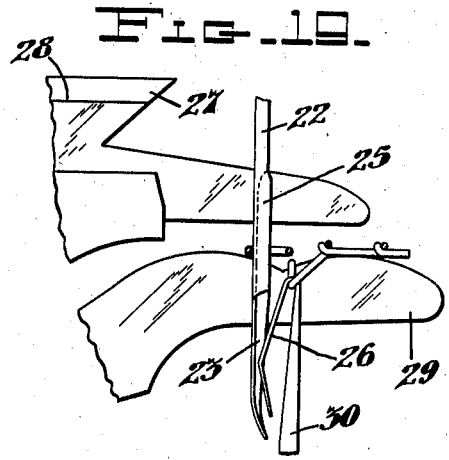
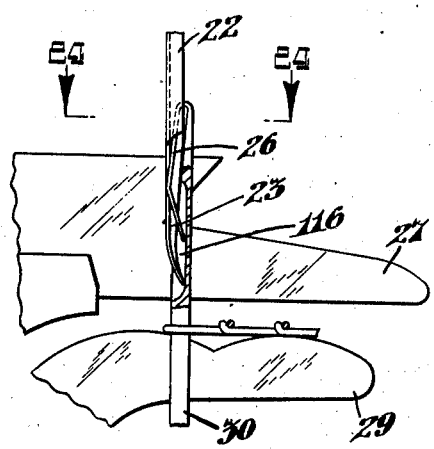
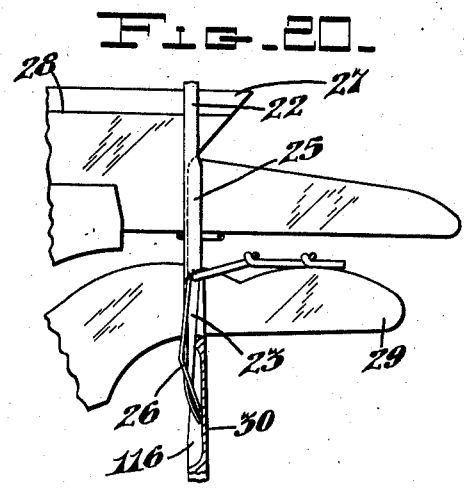
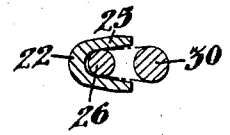
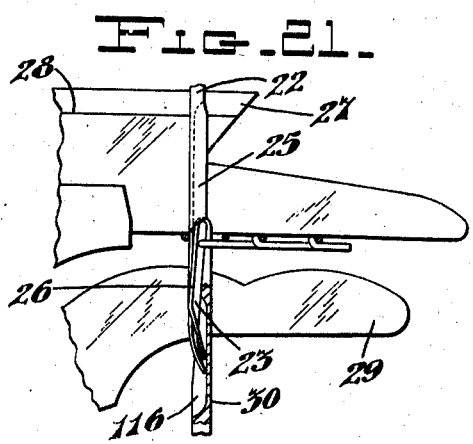
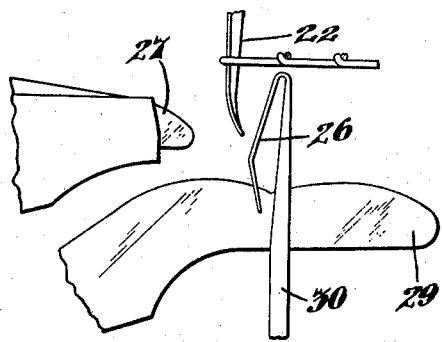

Feb. 25, 1941. W. E. SHEELER 2,233,112
MEANS FOR AND METHOD OF CHANGING PLAIN KNIT LOOPS INTO OTHER LOOPS
Filed April 21, 1939 9 Sheets-Sheet 9
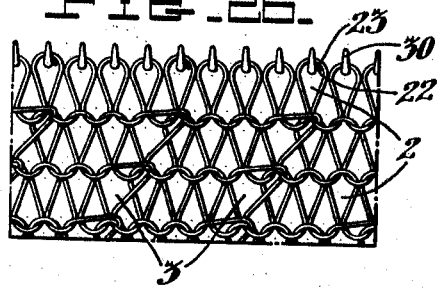
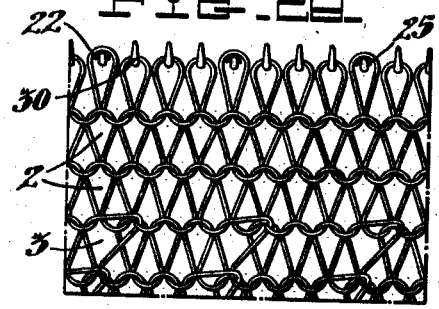
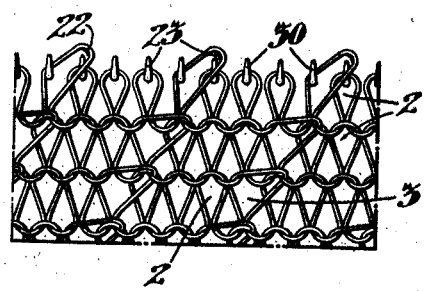
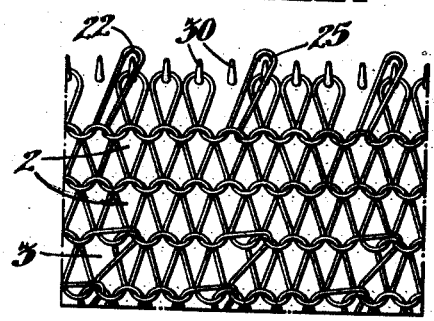
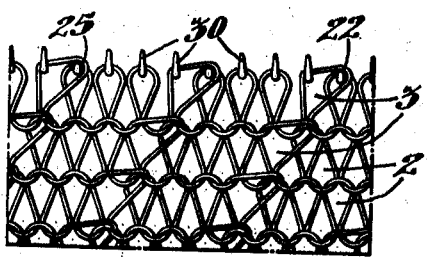
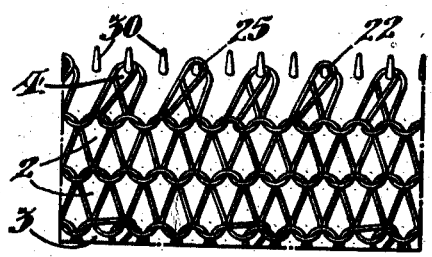
INVENTOR:
William E. Sheeler,
BY
ATTORNEY.

Patented Feb. 25, 1941

2,233,112

UNITED STATES PATENT OFFICE 2,233,112

MEANS FOR AND METHOD OF CHANGING PLAIN KNIT LOOPS INTO OTHER LOOPS

William E. Sheeler, Spring Township, Berks County, Pa., assignor to Berkshire Knitting Mills, Wyomissing, Pa., a corporation of Pennsylvania Application April 21, 1939, Serial No. 269,071

26 Claims. (Cl. 66—96)

This invention relates to straight or Cotton type knitting machines, and more particularly to means in such machines for selectively operating the loop manipulating points to thereby effect selective production of a plurality of different loop formations during the operation of the machine.

Full-fashioned knitting machines have heretofore been provided with means whereby loops may be spread over a plurality of needles to produce non-run fabric. However, the production of this type of fabric has heretofore necessitated the use of an additional point bar in a standard machine, in conjunction with other more or less complicated mechanism and modification of the standard narrowing needle motion.

An object of my invention is to provide novel and simplified means in a straight knitting machine for effecting different forms of loop formations, including barrier stitches.

Another object is to provide such novel means in a knitting machine for effecting the production of plain loops, transferred loops, and spread loops, by utilizing the same elements during the production of all of said different forms of loops, and without stopping the operation of the machine.

A further object is to provide means for selectively operating loop manipulating points for effecting placement of loop portions from one series of needles to another in accordance with different systems to produce different loop formations.

Another object is to provide such novel means which is much simpler in construction and operation, cheaper to manufacture and more economical in operation than any structure previously utilized for a similar purpose.

Another object is to provide a full fashioned knitting machine adapted to make fabric having transferred as well as spread loops but with only one point or lace bar in each knitting section of the machine, and also to provide a simpler and more efficient method of producing such fabric than has heretofore been utilized.

Still another object is to provide means in conjunction with a standard knitting motion and a standard needle narrowing motion in a full fashioned machine, to effect the production of fabric having both spread and transferred loops, which means utilizes a single set of loop manipulating or lace points.

Further objects are, to provide means for moving the loop manipulating point members and needles to a plurality of different cooperative positions in one of which the needle beards will remain open and in another of which the needle beards will be closed by the point members; to provide means for selectively moving the point members and needles into a plurality of different cooperative positions respectively determining the change to be effected in the plain loops on the needles; to provide novel means for selectively effecting different loop formations respectively requiring sidewise cooperative movement of the points relative to the needles; to provide novel means for selectively effecting different loop formations with the same set of cooperative elements including loop manipulating points and needles, and to effect all of such different loop formations without any change in the operative cycle of the needles.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

Fig. 2 is a transverse sectional view of the machine shown in Fig. 1;

Fig. 3 is a sectional view taken substantially on the line 3—3 of Fig. 1;

Fig. 4 is a side view of the special narrowing cam shown in Figs. 1, 2 and 3 and used in connection with my invention;

Fig. 5 is a detail sectional plan view taken substantially on the line 5—5 of Fig. 1;

Fig. 6 is a detail sectional elevation taken substantially on the line 6—6 of Fig. 1;

Fig. 7 is a front elevation on an enlarged scale of portions of the mechanism shown in Fig. 5, but illustrating also certain modifications;

Fig. 8 is a fragmentary sectional view of a portion of the apparatus shown in Fig. 7;

Fig. 9 is a detail in cross section taken substantially on the line 9—9 of Fig. 7;

Fig. 10 is a fragmentary view of a portion of the left part of the machine shown in Fig. 1;

Fig. 11 is an elevation on an enlarged scale of a needle bank, narrowing combs, and lace bar with lace points therein, in accordance with my invention;

Fig. 12 is a sectional elevation on an enlarged scale of a portion of the apparatus shown in Figs. 1 and 7, parts being shown in one operative position;

Fig. 13 is a view similar to Fig. 12 but showing the parts in another operative position;

Figure 1:
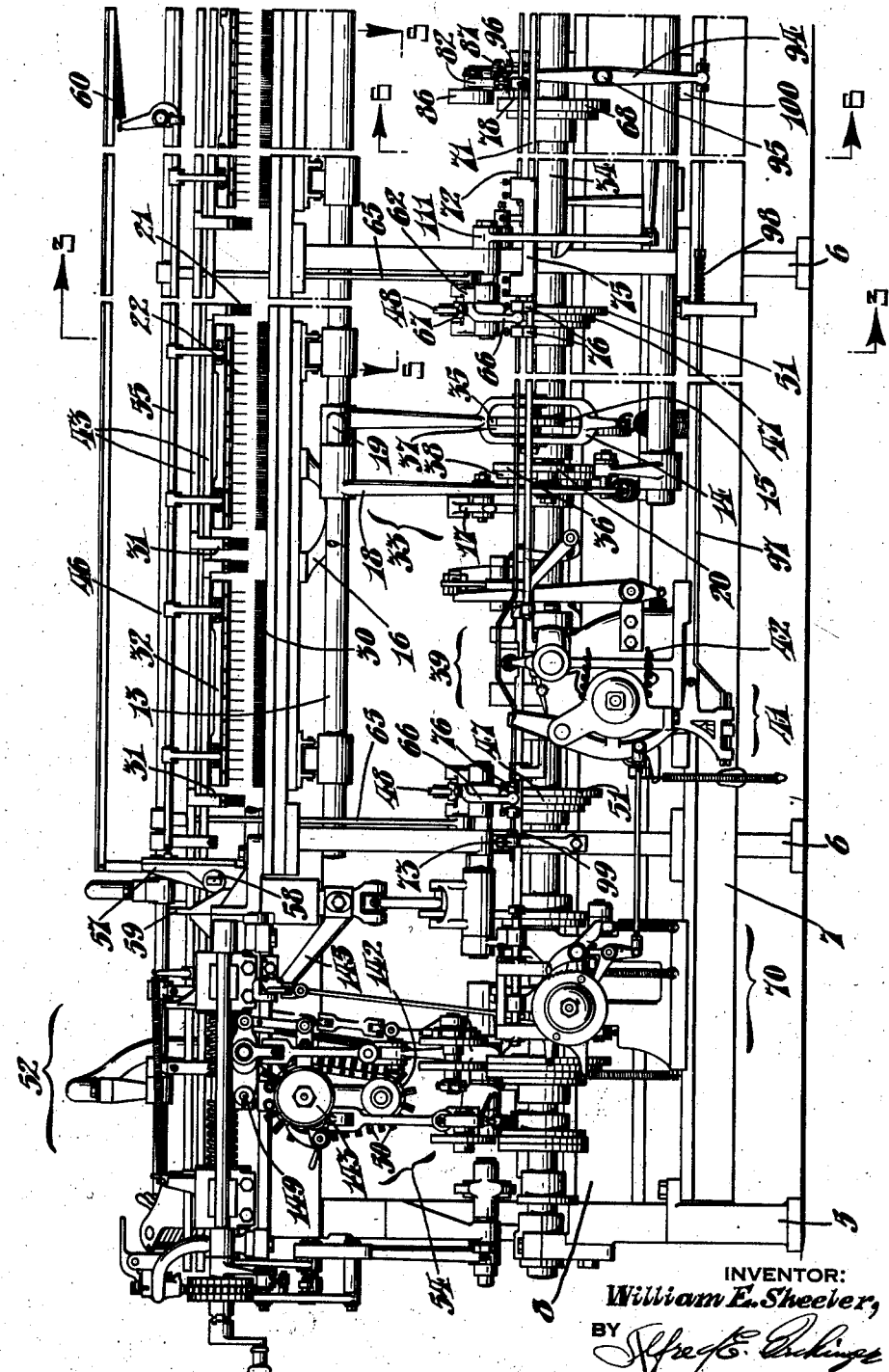
Figure 1 is a front elevation of a full fashioned knitting machine in which my invention has been shown.

Figs. 14 to 21 inclusive, are enlarged detail views illustrating the relative positions of the loop manipulating points and needles at different points in a given revolution of the cam shaft while spreading loops to make non-run fabric;

Fig. 22 is a cross sectional view taken substantially along the line 22—22 of Fig. 14;

Fig. 23 is an enlarged detail view showing the relative positions of the needles and loop manipulating points at a given point in the revolution of the cam shaft during which loops are transferred to form picot or lace stitches, Fig. 23 being taken at the same point in the revolution of the cam shaft as Fig. 14;

Fig. 24 is a cross sectional view taken substantially along the line 24—24 of Fig. 23;

Fig. 25 is an enlarged detail view showing the relative positions of the needles and lace points at a given point during a revolution of the cam shaft in which picot or lace stitches are formed, Fig. 25 being taken at the same position in the revolution of the cam shaft as Fig. 18;

Figs. 26, 27 and 28 are diagrammatic views of fabric portions and illustrate the positions of the needles and loop manipulating points with respect to the fabric portions, said positions of the points and needles respectively corresponding to the positions shown in Figs. 16, 18 and 21; and Figs. 29, 30 and 31 are views similar to Figs. 24, 25 and 26 and show the relative positions of the needles and loop manipulating points corresponding to Figs. 23, 25 and 20, respectively.

In the drawings and description, only those parts necessary to a complete understanding of the invention have been set forth; further information as to the construction and operation of other elements not herein specifically pointed out, but which are usual and well known, being available in the pamphlet entitled "Full Fashioned Knitting Machines," copyright 1920, and in the "Reading" Full Fashioned Knitting Machine Catalogues, copyright 1929 and 1935, published by the Textile Machine Works, Reading, Pa., and in a pamphlet entitled "Knitting Machine Lectures," published in 1935 by the Wyomissing Polytechnic Institute, Wyomissing, Pa.

In carrying out my invention, a single bar having lace or picot points therein is employed. As usual, said points point downward in use, while the needles point upward, but the lace points differ from the more common form by being cut away for a distance from the tip upward, and by being somewhat shorter than the point members ordinarily used. The cut-away portion of the points extends from one edge inwardly and upwardly far enough to permit the points to enter the loops on the needles without closing the needle beards thereof. After rising above the knockover bits, the points may then be moved laterally to spread the loops in engagement therewith to adjacent needles without withdrawing the loops from their original needles. At a proper point in the cycle of the narrowing motion, namely, during the second downward movement of the needles and points in a given revolution of the machine, the portions of the loops on the points can then be placed on other needles to act as run stops. In accordance with my invention, the machine is operated through a narrowing cycle throughout the spreading of the loops by the cut-away points on the point bar, and also during the ordinary narrowing by the points in the standard narrowing combs; the points in the combs not being cut-away and acting to close the needle beards so the loops engaged thereby can be lifted from their original needles and then transferred to other needles in the usual way.

In order, however, that the lace points may transfer loops to make ordinary lace or picot courses, it is necessary that the lace points close the beards of the needles during the first downward movement of the points and needles so that the points can remove the loops from the needles to transfer them. For this purpose, the cut-away portions of the lace points do not extend so far up on the points that the grooves therein are entirely eliminated. Therefore, by carrying the points somewhat farther down on the needles, when desired, the points operate to close the needle beards and to transfer the entire loops in the way commonly employed when making picot or lace stitches. This additional movement of the points in producing transferred stitches although involving only a slight physical change in the motion and mechanism of the modern type machines such as the well known "Reading" full fashioned knitting machine, results in an entirely new function of the machine.

In accordance with my machine invention, I accomplish the aforesaid variation in the movement of the loop manipulating points without requiring an additional cam, but merely by making the cam for lowering the narrowing machine of slightly different contour for a short distance on one half its face than on the other half, and shifting the cam follower for this cam to run on only one half the face of the cam when it is desired to transfer loops instead of to merely spread them.

Referring to the drawings and more particularly to Figs. 1, 2 and 3, the machine illustrated therein comprises end and center frames 5 and 6, upon which are mounted a front beam 7, a back beam 8, a center bed 9 and a front bed 10, extending only between the center frames, to form a support for the loop forming, narrowing and other usual mechanisms of a full fashioned knitting machine.

Between each pair of center frames 6 are mounted a plurality of knitting sections each having a bank of needles 30, narrowing points 21, carried by a pair of narrowing combs 31 and picot or lace points 22 carried by a bar 32, Figs. 1 and 11. The mechanism for operating the needles 30 is of customary construction as used in the "Reading" type machines and indicated generally at 33 (Figs. 1 and 2) and includes a needle bar 11 in which the needles are mounted, lifting arms 12 which are pivotally connected to the needle bar and which are secured to a needle bar shaft 13, a needle bar lever 14, also secured to the shaft 13 and on which is pivotally mounted a cam follower 15 adapted to cooperate with a plain knitting cam 35.

Forward and rearward movement of the needles 30 is effected by a forked lever 16 secured to the needle bar 11 and pivotally connected to a lever 17 (Fig. 1) which is in turn connected to a presser lever 18 carried by a shaft 19. The lever 18 carries a cam follower 20 for cooperation with a cam 36 on the main cam shaft 34.

Cooperating with the needles 30 in forming into plain loops 2 yarn laid thereto by yarn carriers (not shown) is a sinker head structure 24 including sinkers 27, and dividers 28 which are operated in the well known manner by mechanism not shown. Also cooperating with the needles 30, sinkers 27 and dividers 28 in forming loops are the usual knockover bits 29.

The needles 30 are given at times a motion different from that used in knitting. Such different motion is used at the times the fabric is narrowed by means of the narrowing points 21 and is therefore known as the narrowing cycle, although it is used at other times than in narrowing as will hereinafter appear. It will be understood, however, that the needles 30 and narrowing and lace points 21 and 22 make two downward movements during the revolution of cam shaft 34 while the narrowing cycle is being performed. In order to provide the narrowing cycle when required, the needle operating mechanism 33 includes an additional set of cams 37 and 38 on shaft 34 which cooperates with the needle bar lever 14 and presser lever 18, respectively, and which are brought into play in known manner as desired by a chain motion or mechanism 41 including pattern chain 42 and controlling, among other mechanisms, a shogging means 39 adapted to shift the cam shaft 34 longitudinally to bring the narrowing cams 37 and 38 into play when desired and to shift the cam shaft 34 back again when it is desired to continue knitting with cams 35 and 36 in use. Shogging mechanism 39 is not shown in detail, but is of a usual form which has been used for some years in the well known "Reading" type of knitting machines. An equivalent means is necessarily present on all full-fashioned knitting machines. A means of the form shown herein is illustrated and described in Ischinger, No. 2,101,048, December 7, 1937, Fig. 28, and lines 10 to 30, second column, of page 13 thereof.

The said narrowing combs 31 are mounted directly on the usual narrowing rods 43 which form parts of the known means whereby combs 31 are supported and moved. In narrowing, combs 31 are first dipped with their points 21 from their normal raised position to engage loops on the knitting needles 30, then lifted somewhat and shifted and dipped again to place the previously lifted loops onto needles adjacent the ones on which they were formed. As previously indicated, both dipping actions occur during a single revolution of shaft 34. For the purpose of supporting combs 31 and rods 43 both when inactive and during dipping and shifting, the rods 43 are incorporated in a narrowing machine 44 which includes also a usual back narrowing shaft 45 and a usual front narrowing shaft 46 and other details, all of which are shown as of a well known character, except as to dipping or narrowing cam 47 and means for shifting the follower 48 therefor.

In the machine illustrated, the narrowing rods 43 are supported from the front narrowing shaft 46 in a usual way and when the narrowing machine is lowered by hand from its rest position to that shown in Figs. 1, 2 and 3 the follower 48, which then supports narrowing machine 44, first rests on a round cam disk 51 on shaft 34 in the usual way. Then, when shaft 34 has been shifted to the right by mechanism 39, follower 48 rests on cam 47 centrally thereof as shown in Fig. 12 and the narrowing machine is then lowered during the first half of the rotation of cam 47 so that the points 21 in combs 31 can pick up the loops as shown in Fig. 23, the combs 31 having the usual full bodied points for this purpose which close the beards of the needles when they descend in the usual way. When the combs have picked up the selvage loops, rods 43 are shifted by the usual means on the narrowing head 52 at the end of the machine so that the loops held by the combs are deposited on the needles on the next downward movement of the combs which occurs in the last half of the revolution of shaft 34. During the time combs 31 are in use, the cams giving the knitting needles their narrowing motion are in use because the shaft 34 has been shogged or shifted along its axis of rotation.

Also suspended from the front narrowing shaft 46 are the picot, point or lace bars 32, one for each knitting section. Bars 32 have their points 22 spaced at a larger pitch than the knitting needles 30. Ordinarily, the spacing of the points in the bars is twice that of the knitting needles, while that illustrated for bars 32 is four times that of the knitting needles. Further, the points 22 in bars 32 are illustrated as a little shorter than the points 21 in combs 31 as appears at 40 in Fig. 11, but I do not limit myself to the proportions shown. Ordinarily, of course, the points 22 in the lace or picot bars are the same length as the points in the narrowing combs. The points of bars 32 are ordinarily used for transferring loops in making picot or lace courses. In accordance with my invention, bars 32 are used not only for picot courses, but also for producing stretched or spread loops 3 embracing a plurality of needles, as for instance, to form non-run fabric. For the latter purpose, I have found it desirable to provide the points 22 with a cut-away portion 23, as shown in the drawings, the cut-away portion extending for a distance running back from the point end enough so that when the cut-away points are dipped to engage certain of the loops 2 on the needles 30 the full width portions 25 of the lace points do not cover beards 26 of the needles thereby permitting the beards to remain open. This relationship is illustrated in detail in Figs. 14, 15, 16, 22 and 26. Consequently, each point can engage one half of a loop 2 as in Fig. 17 without disengaging the other half from beneath the beard and, when the points and needles have been raised again to the position shown in Fig. 18, the points 22 can be moved along the needle bank to positions above other needles (Fig. 27) and then dipped again as illustrated in Figs. 19, 20 and 21 to place a half of each of the loops engaged by the points around needles 30 alongside those on which the loops were formed thereby forming the spread loops 3, see Fig. 28. During the second dip of a loop spreading operation, the points close the beards of the needles as shown in Fig. 20.

For moving bars 32 longitudinally of the needle banks, I have shown a lace attachment 54, Figs. 1 and 10, at one end of the machine. The attachment 54, the operation of which is controlled by the main pattern chain 42, is of a known type and acts to shift the point bars by shifting the lock stitch shaft 55 on which they are directly mounted at the proper point in each revolution of shaft 34 made by it while in the narrowing position. Attachment 54 not only shifts the point bars a one-needle distance either to the right or to the left at the proper times to spread or transfer loops, but also positions the lace bars to operate on different wales in different courses so that the transferred loops are arranged to effect the desired pattern or that all the wales have spread loops therein for preventing runs in the fabric. The resulting fabric is illustrated in Figs. 26, 27 and 28. It will be seen that the production of the non-run fabric containing stretched loops does not require any modifications of motions or mechanism commonly used in narrowing the selvages.

I have discovered further that it is possible to make ordinary picot courses containing lace or transferred loops 4 by the same bars 32 and points 22 therein used for spreading the loops. For this purpose, the cam 47 is shown as slightly cut down at point 56 (Fig. 4) but on one half only of its face. Therefore, when follower 48 lies in the central plane of cam 47, it is not affected by the cut at point 56 and the points in bar 32 act as hereinabove described during the first dipping movement of a given pair. By shifting follower 48 one half the thickness of cam 47 to the left, when viewed as in Figs. 1, 12 and 13, follower 48 is so placed that it is acted on only by the cut-down half of the cam 47 at point 56 and the points in bars 32 therefore descend lower relatively to the knitting needles at the start of the first dipping movement of a given pair and the beard closing portions 25 of the points thereby are enabled to close the needle beards as shown in Figs. 23, 24 and 29 on the first downward movement of the needles in a given needle narrowing movement. The lace points 22 thereupon pick the loops 2 completely off the needles 30 with which the points are in engagement as shown in Fig. 23 and, upon shifting (Fig. 30) and subsequent second downward movement of points and needles, transfer them a one-needle distance to adjacent needles thereby forming transferred loops 4, see Fig. 31. None of the motions of the bars 32 hereinabove described require any action by or adjustment of the attachment 54 other than those commonly made in the ordinary use of the attachment in making lace designs. The lace attachment mechanism 54 is, in general, of a well known type, very similar mechanisms being illustrated and described in the patents to Gastrich, No. 1,977,656, E. Richter, No. 2,034,990 and M. Richter et al, No. 2,169,979. Although differing somewhat in appearance, the mechanism 54 is also of the same general function and operation as the lace clock attachment M—41 described and illustrated in pages 205 to 238 inclusive of the Parts Catalogue of The "Reading" Full Fashioned Knitting Machine copyrighted in 1935 by Textile Machine Works, Reading, Pa. The difference in appearance between the mechanism 54 herein and the said lace clock attachment in said Parts Catalogue is due primarily to placing the auxiliary pattern chain above instead of below the top members of the machine frame. A full illustration and description of a lace clock attachment almost identical with that illustrated herein is contained in the instruction sheets for adjusting and operating lace clock attachments, which sheets were issued to the trade in the year 1932 by Textile Machine Works, Reading, Pa. Only such changes are required in the previous lace clock mechanisms for purposes of the present invention as are obvious to those skilled in such mechanisms. For purposes of convenience, however, the mechanism 54 may briefly be described as follows:

The end of lock stitch shaft 55 rests against a vertical edge on a movable head 57 (Fig. 10) which is mounted for horizontal movement on the frame of the machine and which carries a roller 58 adapted to cooperate with a cam slide 59. The slide 59 is mounted for vertical movement on the frame of the knitting machine and it moves the head 57 horizontally by thrusting its inclined edge against the roller 58. At the beginning of any lace or loop spreading operation the cam slide 59 is elevated to its highest position throwing the lace points to an extreme position farthest from the cam slide. The wales which the lace points will operate upon in any given operation are then determined by lowering cam slide 59 allowing shaft 55 and bracket 57 to slide back, following the contour of the cam slide, a predetermined distance under the influence of a spring means 60 (Fig. 1) commonly employed on the shaft 55 in connection with lace attachments, and spring means (not shown) acting upon the head 57. The distance means 60 is permitted to move shaft 55 in any given case is determined by the contact of a tappet piece 53 fixed to the lower edge of bracket 57 which contacts with a stepped edge of a segment 49. While only one segment 49 is shown, two or more may be used depending on the number of wales desired to be acted on by the lace points in a given cycle of operations. The stepped segment 49 is mounted to swing about a horizontal axis 149 so that one or another of the steps on the edge remote from the axis comes into contact with the tappet piece 53 on head 57 to determine the extent of its movement under the influence of its spring means (not shown). The angular position of the stepped segment 49, and therefore the extent of movement of shaft 55 from its extreme position, is determined by an auxiliary pattern chain 142 which has pins 50 projecting laterally from its links, the particular step on the segment 49 which cooperates with bracket 57 being determined by the length of the pin which supports the segment. When cam slide 59 is in its highest position, segments 49 are held up clear of pins 50 by a support member 145 on the vertical cam slide 59 so that the chain can be moved without difficulty.

Inasmuch as bars 32 have only one-fourth as many points as there are knitting needles, the picot courses require that the arrangement shown shall shog and maintain the main cam shaft 34 in its shogged or narrowing position during two successive revolutions thereof so that half the plain loops 2 in a given course may be transferred to form the loops 4. After every fourth loop has been transferred, Fig. 30, effected during the first revolution of the cam shaft in shogged position, the remaining loops to be transferred are acted upon during the second revolution of the cam shaft in its shogged position, in the same manner as the first series of loops are manipulated as shown in Figs. 29 and 30, thereby completing a picot or lock stitch course, Fig. 31. Therefore the mechanism 54 is provided with the means necessary to produce this effect by holding the shogging control lever of the shogging means 39 in active position for two successive revolutions of the cam shaft, the main pattern chain being rendered inactive and put out of operation when the mechanism 54 goes into action. The number of revolutions of main cam shaft 34 that the main chain 42 is thus incapacitated is determined by the lace course regulator 70, associated with mechanism 54, which is constructed and operated in well known manner to effect shogging of the cam shaft 34 during operation of the mechanism 54. The lace course regulator 70 is set into operation by a button on the main pattern chain 42 when the mechanism 54 is to operate.

The mechanism 54 differs from the previously used mechanisms having the same general purpose and appearance in that it has pins for controlling the operation of the loop manipulating points to produce different loop formations on the same auxiliary pattern chain 142. Chain 142 therefore has two sets of pins or screws 50 thereon which control respectively the loop transferring operations and the loop spreading operations of the points 22 on lace bars 32. As a convenient way of shifting the control of bars 32 from one set of pins 50 to the other, the racking means for chain 142 is arranged to rack this chain two links at each racking operation. The pins of one set are then set on alternate links and those of the other set on the remaining alternate links. If then the mechanism 54 is set by hand so that one of the pins 50 of one set is in operative position, the pins of the same set will continue to control the operation of points as long as desired. When the other set is to be brought into play, the chain 142 is racked by a hand wheel 143 so as to bring a pin of the other set into operative position. Thereupon, the other set will begin to function as soon as the main chain 42 throws mechanism 54 into operation to control the shogging of cam shaft 34.

The axis 149 of stepped segment or segments 49 which control the positions of the lace bars 32 at the start of a loop transferring or spreading operation is mounted eccentrically as shown in Fig. 10 so that, by turning axis 149, the segment is moved a one-needle distance to move shaft 55 and the loop manipulating points a corresponding distance either to the right or to the left in accordance with the system in use and the pattern of fabric desired; said movement being effected at the time the loop manipulating points are to be moved between dips to transfer or spread the loops.

The moving of cam follower 48 relative to cam 47 requires a special mechanism and for this purpose I have provided the arrangement illustrated in detail in Figs. 5, 6, 12 and 13 which will now be described:

The cam follower 48 is journalled on a horizontal pin shaft 61 which is fixed in a forked portion of a lever 62 pivoted at the front of the machine at 63 (Fig. 3) and having a pivoted connection near its rear end at 64 with a link 65 by which lever 62 supports narrowing machine 44 in the usual way. The pin 61 is long enough, however, to permit follower 48 to shift thereon as illustrated in Figs. 12 and 13. Means are provided for shifting follower 48 comprising a shift lever 66 pivoted intermediate its ends on a pin 67 fixed on and projecting vertically from the upper side of lever 62. Lever 66 is forked at its rear end to embrace the edge of a follower 48, as shown in Fig. 5. Whenever lever 66 swings on pivot 67, follower 48 is shifted along its shaft 61. In the arrangement shown, the impulse for swinging lever 66 to shift follower 48 from the position shown in Fig. 12 to that shown in Fig. 13 is derived from a cam 68 on shaft 34. The impulse to swing lever 66 is transmitted by a rigging including a rod 72 arranged to move in brackets 73 fixed to the frame of the machine. Inserted in and fixed to rod 72 by suitable means such as bolts 74 is a casting 75 secured to rod 72 and slidable on rod 71 are lugs 76 which project horizontally from the rod 72 and which are spaced longitudinally thereof to receive between them the downturned end 77 of lever 66. For moving rod 72 by cam 68, rod 72 has a pin 78 fixed thereon and projecting upward between the ends of a fork 81 at the forward end of a lever 82 pivoted for vertical movement on a horizontal pivot pin 85 mounted in a forked bracket 84, in turn pivoted for horizontal movement on a vertical pin 83 carried by the bracket 89 which is mounted on the back beam of the machine. This arrangement permits the forward portion of lever 82 to swing both vertically and horizontally. Intermediate fork 81 and pin 85, lever 82 carries two rollers 86 and 87. Roller 86 is mounted to revolve on a horizontal bolt or pin 88 and extends above the cam 68 so that, when roller 86 contacts the edge of the cam, the lever 82 is supported in definite position with respect to the axis of rotation of the cam. Roller 87 is mounted to revolve on a pin or bolt 90 lying substantially in the same vertical plane as pivot 83 and so set that when the lever 82 is properly positioned, roller 87 will contact an arcuate camming flange or piece 91 projecting from one side face of cam 68. Lever 82 is held normally in the position shown in Fig. 5, in which follower 48 is biased to the right by means of a compression spring 92 acting between a collar 93 on rod 72 and the bracket 73; a second collar 99 on the rod 72 coacts with one of the brackets 73 to limit the extent of leftward movement of the rod 72. Lever 82 is held normally in the raised position shown in Fig. 6 by a lever 94 pivoted on a fixed horizontal pivot 95 of the bracket 100 supported on the front beam of the machine. Lever 94 has a shoulder 96 (Fig. 1) near its upper end adapted to support lever 82 in the position shown in Fig. 6 and in which the roller 86 is clear of the rim of cam 68 and roller 87 is outside the path of camming flange 91. A connection is provided, however, between the pattern mechanism 41 and lever 94 whereby a button on chain 42 pulls on the lower end of lever 94 at desired times through a rod 97 to throw shoulder 96 out from under lever 82. The lever then drops so that its weight is supported on cam 68 by roller 86, and roller 87 is then held at the proper radius so that camming flange 91 strikes roller 87 to shift levers 82 and 66 and thereby shift follower 48 so that it is engaged by only the low half of cam 47 at point 56, see Fig. 13. The cut-away loop manipulating points in bar 32 thereupon transfer the loops on which they act instead of only spreading them. In order to return the levers 66 and 82 to the positions shown in Fig. 5, as soon as rod 97 is released by the button on chain 42, a spring 98 on rod 97 pushes on the rod in the direction to throw shoulder 96 back under lever 82. Further, the cam 68 has a cam projection 101 on its rim adapted to raise roller 86 and lever 82 after roller 87 passes out of engagement with the camming flange 91 to thereby permit lever 94 to move back into position to support lever 82. At the same time projection 101 raises lever 82, the spring 92 pushes the forward ends of levers 66 and 82 to the left as viewed in Fig. 5 to return the parts to the positions shown in Figs. 5 and 6. In Fig. 1, two levers 66 are shown, there being as many levers 66 as there are levers 62 and links 65 on the machine. The rod 72 is therefore shown in Fig. 1 as extending to the left hand lever 66 to operate it.

In Figs. 7, 8 and 9, a modification of the means for operating levers 66 is shown. In this modification, one of the bolts 74 is replaced by a handle 102 whereby the rod 72 may be shifted to shift levers 66 by hand when desired independently of the pattern chain. Also, in Fig. 7 a block 103 is fixed to rod 72 and is provided with a pair of notches 104 in its upper surface so that a plunger 105 having a lower end 106 doubly bevelled complementally to the notches 104 may engage the notches to hold the rod 72 releasably in the positions required for holding the follower 48 in its different operating positions. Block 103, like casting 75, is slidable on rod 71, which maintains it in the desired plane. The plunger 105 is pressed by spring 107 into notches 104 and the plunger is mounted in a block 108 fixed to a part of the frame of the machine.

It will be understood that the lever 62 may be raised to throw the narrowing machine into rest or inoperative position whenever desired by means of a known or usual arrangement including a hand lever 111 pivoted on the same axis 63 as lever 62 and having a connection through a link 115 with a bell lever 112 having an upstanding arm 113 thereon adapted when lever 112 is rocked by hand lever 111 to engage a shoulder 114 at the rear end of lever 62 to lift the lever 62 and thereby the narrowing machine 44, to remove follower 48 from cam 47 and to thereby facilitate shifting of the follower 48 relative to the cam 51 preparatory to shifting of the cam shaft 34 and to thereby condition the mechanism to effect the desired loop formation during operation of the machine when the cam shaft is in its shogged position.

A lug 120 (Figs. 7 and 8) extending from the casting 75 is movable from one side of portion 110 of lever 111 to the other coincident with the shifting of the follower 48 with respect to the cam 47, and thereby serves as a positive lock arrangement for preventing shifting of the follower while the lever 111 is down, it being impossible to move the lug past the lever 111 unless the latter is in raised position. This lug 120 serves the additional function of preventing lowering of the follower into engagement with the cam 47 whenever the follower is not correctly aligned either with the cut out portion 56 to effect transferring of loops or with the full width of cam to spread loops. Thus, if the follower has been shifted to an intermediate position, upon lowering of the narrowing machine the portion 110 and consequently the lever 111 will not be able to pass the lug 120 but will instead rest thereupon, thereby indicating to the operator that the follower 48 is not properly positioned and consequently preventing the follower 48 from engaging its cam until the follower is properly positioned either with the full width of the cam 47 or with the cut out portion 56 to operate the loop manipulating points in the manner necessary to effect the desired loop formation.

The movements of the bars 32 and consequently of the loop manipulating points 22 in making lock stitch or non-run fabric as hereinafter described are illustrated in some detail in Figs. 14 to 23, inclusive. Fig. 14 illustrates the start of the first down motion of the points 22 and needles 30 during a given revolution of the cam shaft 34 in a needle narrowing motion. From the position of Fig. 14, each point 22 and the needle 30 with which it first cooperates pass downward successively through the positions shown in Figs. 15 and 16, the tip of the points engaging in the grooves 116 of the needles without however engaging their beards 26, the beards of the needles are consequently permitted to remain open as shown and the loops to be positioned beneath the beards. The relative positions of the points 22 and the needles at the point in the cycle corresponding to Fig. 16 are further illustrated in Fig. 26. After descending somewhat below the position shown in Fig. 16 to work the loop up onto the point as shown in Fig. 17, the needle 30 and point 22 begin to ascend and when they have reached the relative positions shown in Fig. 18, the points are then moved a one-needle distance along the needle banks by mechanism 54, whereupon the points and needles again descend together, the points now being in position to cooperate with needles adjacent those shown in Figs. 14 to 18, inclusive. Fig. 27 further illustrates the relative positions of the points and needles at the instant corresponding to Fig. 18. When the points have carried the loops below the lower edges of the sinkers 27 and dividers 28, the sinkers and dividers begin to move forward, the points descending low enough on the needles at this part of the cycle to close the needle beards as shown in Figs. 20 and 21. The relative positions of the points and needles at the point in the cycle corresponding to Fig. 21 are further illustrated in Fig. 28. During the subsequent rise of the needles and points the sinkers strip the loops down below the beards of the needles so that both halves of the loops are held below the beards of adjacent needles as the points and needles are separated.

In case the loops are to be transferred to make a picot or lace course, the points close the needle beards on the first downward movement as shown in Fig. 23 because the points are relatively lower on the needles due to the fact that roller 48 has been shifted to coact with the cutaway portion 56 of cam 47. The loops on the needles engaged by the points are consequently permitted to slide from the needles during the travel of the needle beards into the knockover bits 29, whereupon the points lift the loops clear of the needles, in the same manner as shown in Fig. 25, on the upward movement of the points and needles following the first dip thereof during a given revolution of the cam shaft. Fig. 25 represents the same relative point in the picot cycle that is represented by Fig. 18 in the loop spreading cycle. The lace bars are shifted longitudinally of the needle banks, intermediate the first and second downward motions of the needles, by mechanism 54 in the loop transferring cycle, as well as in the loop spreading cycle; Figs. 29, 30 and 31 respectively illustrate the relative positions of the points and needles in the steps of picking the loops off the needles on which they were formed, shifting of the loops along the needle bank into alignment with adjacent needles, and placing the loops on needles adjacent those on which they were formed. Fig. 31 shows every other loop as being a transferred loop 4, thus requiring the operation of the bar 32 through a second loop transferring cycle. It will be understood that mechanism 54 not only shifts the points a one-needle distance in both spreading or stretching the loops and in transferring the loops, but also functions to position the point bars 32 so as to align the loop manipulating points with desired needles preparatory to the first dipping movement of each cycle. Thus in runproof fabrics successive spreading operations are performed on different wales as illustrated in Figs. 26 to 28 to form lock stitches in every wale and thereby protect the fabric completely against runs.

Furthermore, although cut out loop manipulating points of the type herein disclosed have hitherto, so far as is known, been used for the sole purpose of spreading loops, and for effecting such spreading in one direction only, nevertheless by means of the present arrangement the function of this type of point is extended to the production of transferred loops, and further to the transferring of loops selectively to the right and to the left of the needles on which they were originally formed, thereby appreciably extending the utility of such loop manipulating points, and also greatly increasing the number of patterns and designs producible therewith.

From the foregoing it will be understood that I have provided a simple means whereby one series of loop manipulating points may be operated in accordance with different systems to produce different loop formations.

Of course, the improvements specifically shown and described by which I obtain the above results, can be changed and modified in various ways without departing from the invention herein disclosed and hereinafter claimed.

I claim as my invention:

1. In a straight knitting machine the combination of a plurality of spring beard needles, a bar provided with loop manipulating point members for cooperating with said needles, and means for moving the needles and bar into a plurality of different cooperative positions during the initial loop engaging movement of the bar including one position at which the beards of the needles remain open and another position at which the beards are closed.

2. In a straight knitting machine comprising a plurality of needles, means for forming loops on said needles, and a bar provided with a plurality of loop manipulating point members for cooperation with said needles, of means for moving the bar into a plurality of cooperative positions relative to said needles during the loop engaging movement of the bar for respectively determining the change to be effected in the loops formed on said needles.

3. In a straight knitting machine comprising a plurality of needles, means for forming loops on said needles, a bar provided with a plurality of cut-away loop manipulating point members, of means for selectively operating the bar during the loop engaging movement of the bar through different cooperating cycles to move a portion of certain of the loops formed on said needles from one needle to another in a plurality of different methods respectively changing one or more of said plain loops into other forms of loops, and means for determining selective operation of the bar.

4. In a full fashioned knitting machine, in combination, a plurality of spring beard needles, means for forming loops on said needles, a point bar provided with loop manipulating point members for cooperating with said needles, means for operating the bar during the loop engaging movement of the bar through different cycles of operation for selectively producing spread or transferred loops, and means for selectively determining the operative cycle of said bar.

5. In a straight knitting machine, in combination, a plurality of spring beard needles, means for forming loops on said needles, a point bar provided with loop manipulating points for cooperation with said needles, means for relatively moving the bar and needles to different cooperative positions during the initial downward or loop engaging movement of the bar in each operative cycle thereof in one of which the needle beards will be closed and in another of which the needle beards will remain open, means for operating said bar to cause said points to spread loops around needles to one side of the forming needles, and means for operating said bar to cause said points to transfer loops from the needles on which they were formed to needles on either side of said forming needles.

6. In a straight knitting machine, in combination, a plurality of spring beard needles, means for forming loops on said needles, a point bar having a loop manipulating point adapted to selectively close or to permit the beard of a selected needle to remain open depending upon the extent of movement of the point relative to the needles during the initial downward or loop engaging movement of the bar in each operative cycle thereof, means for operating said bar to cause said point to engage a loop on a selected needle and spread said loop in one direction only around an adjacent needle, and means for selectively operating said bar to cause said point to engage and remove a loop from a selected needle and selectively transfer said loop to a needle on either side of said selected needle.

7. In a straight knitting machine, in combination, a plurality of spring beard needles, means for forming loops on said needles, a point bar provided with loop manipulating points adapted to selectively close or to permit the beards of certain of said needles to remain open depending on the extent of movement of the points relative to the needles during the initial downward or loop engaging movement of the bar in each operative cycle thereof, means for operating said bar to cause said points to spread loops around needles positioned to one side of the forming needles, means for operating said bar to cause said points to selectively transfer loops from the needles on which they were formed to needles on either side of said forming needles, and means for determining selective operation of said bar.

8. In a full fashioned knitting machine, in combination, a plurality of spring beard needles, means for forming loops on said needles, narrowing combs, means for dipping said combs to pick up loops from the needles on which they were formed, a point bar provided with loop manipulating point members for cooperating with said needles, means for relatively moving the bar and needles to different cooperative positions in one of which the needle beards will be closed and in another of which the needle beards will remain open, and means for operating said bar to stretch selected loops over two needles and including said dipping means without change in action from that used with said narrowing combs.

9. In a full fashioned knitting machine, in combination, a plurality of spring beard needles, means for forming loops on said needles, narrowing combs having points adapted to close the needle beards, means for dipping said combs to pick up loops from the needles on which they were formed, a bar provided with loop manipulating points for cooperating with said needles and permit the needle beards to remain open when dipped to the same extent as said combs, means for operating said bar to stretch selected loops over two needles and including said dipping means without change in action from that used with said narrowing combs and means for effecting the movement of said loop manipulating points to close said needle beards when dipped to pick up loops from the needles on which they were formed.

10. The method of forming non-run fabric in a full-fashioned knitting machine comprising, knitting a course of loops, stretching certain of said loops by loop manipulating points over two needles by a motion including dipping said loop manipulating points, similarly stretching loops in subsequent courses and in different but adjacent wales from those previously stretched to lock a loop in each wale and repeating said stretching and locking throughout a large portion of the fabric, narrowing certain courses of the said fabric by narrowing points by a motion involving dipping the narrowing points through the same distance as the dip of said loop manipulating points during said stretching action, and lifting and transferring loops in a course in said fabric by said loop manipulating points by a motion involving dipping the loop manipulating points through a greater distance than the dip of the said narrowing points in narrowing.

11. In a full-fashioned knitting machine, in combination, a plurality of spring beard needles, means for forming loops on said needles, a narrowing mechanism including a front narrowing shaft having a point bar and narrowing combs suspended therefrom, said bar having loop manipulating points and said combs having ordinary or narrowing points, means including said bar and its loop manipulating points for stretching certain loops over two needles involving dipping said shaft a given distance when said point bar is in use without closing the needle beards to pick up half of each of said certain loops on the loop manipulating points, means for narrowing fabric being knitted involving dipping said shaft said certain distance when said combs are in use to close the needle beards of the needles acted on by the combs to lift certain loops entire from their needles, and means to transfer loops with said loop manipulating points while said bar is in use including means to dip said shaft more than said certain distance and to lift certain loops completely from their needles.

12. In a full-fashioned knitting machine, in combination, a narrowing machine, a cam shaft having a cam thereon adapted to sustain the weight of said machine during a complete revolution of said shaft and to lower and raise said machine twice during a revolution, said cam having a cut-away portion extending a portion only of one half its perimeter in length and only a fraction of the face of the cam in width, a follower intermediate said cam and said machine, and means to shift said follower to cause it to be supported either on said cut-away portion or on the remaining face portion as desired during the portion of the revolution in which the follower passes the cut-away portion of the cam.

13. In a full-fashioned knitting machine, in combination, a narrowing machine, a cam shaft having a cam thereon adapted to sustain the weight of said machine during a complete revolution of said shaft to lower and raise said machine twice during a revolution, said cam having a cut-away portion extending a portion only of one half of its perimeter in length and only a fraction of the face of said cam in width, a follower intermediate said cam and said machine, a pattern device, and means controlled by said pattern device to shift said follower and to cause it to be supported either on said cut-away portion or on the remaining face portion as desired during the portion of the revolution in which the follower passes the cut-away portion of the cam.

14. In a full-fashioned knitting machine, the combination as set forth in claim 12 and in which the means for shifting the follower comprises a combined sustaining and shifting cam, a lever having two followers thereon, one adapted to engage the rim of said cam and the other a side portion thereof, and means for holding said lever in a relatively elevated position in which both said followers are inoperative and for releasing said lever so that said one follower rests on the rim of said cam, said cam and other follower arranged to coact when said lever is lowered to produce a shifting impulse.

15. In a full-fashioned knitting machine, the combination as set forth in claim 12 and in which the means for shifting the follower comprises a combined sustaining and shifting cam, a lever having two followers thereon, one adapted to engage the rim of said cam and the other a side portion thereof, means for holding said lever in a relatively elevated position in which both said followers are inoperative and for releasing said lever so that said one follower rests on the rim of said cam, said cam and said other follower arranged to coact when said lever is lowered to produce a shifting impulse, and pattern means for causing said holding and releasing means to release said lever, said cam arranged to act on said one follower to raise said lever after said shifting impulse has been produced.

16. In a full fashioned knitting machine, in combination, a plurality of spring beard needles, means for forming loops on said needles, a point bar provided with cut-away loop manipulating point members for cooperating with said needles, means for operating the bar during the loop engaging movement of the bar through different cycles of operation for selectively producing spread or transferred loops, and means for selectively determining the operative cycle of said bar.

17. In a straight knitting machine, in combination, a plurality of spring beard needles, means for forming loops on said needles, a point bar having a cut-away loop manipulating point adapted to selectively close or to permit the beard of a selected needle to remain open depending upon the extent of movement of the point relative to the needles during the initial downward or loop engaging movement of the bar in each operative cycle thereof, means for operating said bar to cause said point to engage a loop on a selected needle and spread said loop in one direction only around an adjacent needle, and means for selectively operating said bar to cause said point to engage and remove a loop from a selected needle and selectively transfer said loop to a needle on either side of said selected needle.

18. In a full fashioned knitting machine, in combination, a plurality of spring beard needles, means for forming loops on said needles, a bar provided with loop manipulating point members for cooperating with said needles, means for selectively operating the bar to move a portion of certain of the loops formed on the needles from one needle to another in a plurality of different methods including a cam having a plurality of cam paths and a cam follower and means for selectively aligning said cam follower with one of said cam paths during each of said methods.

19. In a straight knitting machine the combination of a plurality of spring beard needles, a bar provided with loop manipulating point members for cooperating with said needles, means for moving the needles and bar into a plurality of different cooperative positions including one position at which the beards of the needles remain open and another position at which the beards are closed, comprising a cam having a plurality of cam paths, a cam follower and means for selectively aligning said cam follower with one of said cam paths to effect one or the other of said cooperative positions.

20. In a straight knitting machine comprising a plurality of needles, means for forming loops on said needles, and a bar provided with a plurality of loop manipulating point members, of means for selectively operating the bar through different cooperating cycles with respect to said needles respectively changing one or more of said plain loops into other forms of loops comprising a cam having a plurality of cam paths, a cam follower and means for selectively aligning said cam follower with one of said cam paths.

21. In a full fashioned knitting machine, in combination, a narrowing machine including a cam follower, a cam shaft, means including a cam on said cam shaft having a plurality of paths adapted to operate said narrowing machine through a plurality of different cycles, and means for selectively aligning said cam follower with said cam paths.

22. In a full fashioned knitting machine, in combination, a narrowing machine including a cam follower, means including a plurality of cam paths adapted to operate said narrowing machine through a plurality of different cycles, means for selectively aligning said cam follower with one of said cam paths, and means for aligning said cam follower with the other of said cam paths.

23. In a full fashioned knitting machine, in combination, a plurality of needles, means for forming loops on said needles, a narrowing mechanism having a point bar and narrowing combs for cooperative engagement with said needles, a cam follower for said narrowing machine, a cam shaft, means including a plurality of cam paths on said cam shaft adapted to operate said narrowing machine through a plurality of different cycles, means for selectively aligning said cam follower with one of said cam paths to effect the initial engagement of said points and needles during one of said cycles in which the needle beards remain open and to effect the initial engagement of said narrowing combs and needles during another of said cycles in which the needle beards are closed and means for aligning said cam follower with another of said cam paths to effect the initial engagement of said points and needles during another of said cycles in which the needle beards are closed.

24. In a full fashioned knitting machine, in combination, a narrowing machine, a cam shaft having a cam thereon adapted to sustain the weight of said narrowing machine during a complete revolution of said shaft and to lower and raise said machine twice during a revolution, said cam having a cut-away portion extending over a portion only of the width of the cam, a follower intermediate said cam and said machine, means to shift said follower to cause it to be aligned with either the cut-away portion or with the remaining face portion of said cam only when the weight of said narrowing machine has been removed from said cam, and means for removing the weight of said machine from said cam.

25. In a full fashioned knitting machine, in combination, a narrowing machine, a cam shaft having a cam thereon adapted to sustain the weight of said narrowing machine during a complete revolution of said shaft and to lower and raise said machine twice during a revolution, said cam having a cut-away portion extending over a portion only of the width of the cam, a follower intermediate said cam and said machine, means to shift said follower to cause it to be aligned with either the cut-away portion or with the remaining face portion of said cam only when the weight of said narrowing machine has been removed from said cam, means for removing the weight of said machine from said cam and including means for preventing shifting of said follower while the weight of said narrowing machine is on said cam.

26. In a full fashioned knitting machine, in combination, a narrowing machine, a cam shaft having a cam thereon adapted to sustain the weight of said narrowing machine during a complete revolution of said shaft and to lower and raise said machine twice during a revolution, said cam having a cut-away portion extending over a portion only of the width of the cam, a follower intermediate said cam and said machine, means to shift said follower to cause it to be aligned with either the cut-away portion or with the remaining face portion of said cam only when the weight of said narrowing machine has been removed from said cam, means for removing the weight of said machine from said cam and means for releasably maintaining said follower in either of its shifted positions.

WILLIAM E. SHEELER.